United States Patent
Glassell et al.

(10) Patent No.: US 12,313,565 B2
(45) Date of Patent: *May 27, 2025

(54) FINISHING LINE AUTOMATIC INSPECTION SYSTEM AND METHOD

(71) Applicant: Columbia Insurance Company, Omaha, NE (US)

(72) Inventors: Richard Glassell, Dalton, GA (US); Chad Christman, Dalton, GA (US); Alex Epstein, Dalton, GA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,931

(22) Filed: Dec. 21, 2023

(65) Prior Publication Data
US 2024/0125710 A1    Apr. 18, 2024

Related U.S. Application Data

(63) Continuation of application No. 17/645,519, filed on Dec. 22, 2021, now Pat. No. 11,892,417.
(Continued)

(51) Int. Cl.
*G01N 21/89* (2006.01)
*B07C 5/342* (2006.01)
(Continued)

(52) U.S. Cl.
CPC ......... *G01N 21/8901* (2013.01); *B07C 5/342* (2013.01); *B07C 5/36* (2013.01);
(Continued)

(58) Field of Classification Search
CPC .............. B07C 5/36; B07C 5/14; B07C 5/342
(Continued)

(56) References Cited

U.S. PATENT DOCUMENTS

| | | |
|---|---|---|
| 3,807,553 A | 4/1974 | Billett |
| 4,934,228 A | 6/1990 | Bolton |

(Continued)

FOREIGN PATENT DOCUMENTS

| | | |
|---|---|---|
| DE | 202016102541 U1 | 5/2017 |
| JP | 2004-010288 A | 1/2004 |

OTHER PUBLICATIONS

U.S. Appl. No. 17/645,519 U.S. Pat. No. 11,892,417, filed Dec. 22, 2021 Feb. 6, 2024, Richard Glassell, Finishing Line Automatic Inspection System and Method.

*Primary Examiner* — Michael McCullough
*Assistant Examiner* — Molly K Devine
(74) *Attorney, Agent, or Firm* — Lathrop GPM LLP; Laura A. Labeots (57) ABSTRACT

Automatic detection of mechanical defects in piece parts, such as floor covering planks, enables removal of the defective parts off an inspection path. A bypass conveyor system enables defective parts to be transported beyond or around a manual inspection, enabling personnel performing the subsequent inspection to focus on appearance defects. Once the remaining parts have been inspected by a manual process, the parts transported by the bypass conveyor system are returned to the production line. Defective parts may be distinguished by a marking capability that provides the ability to mark according to a variety of classes of defects.

19 Claims, 5 Drawing Sheets

Related U.S. Application Data (60) Provisional application No. 63/130,498, filed on Dec. 24, 2020.

(51) Int. Cl.
  *B07C 5/36* (2006.01)
  *G01N 21/95* (2006.01)
  *G01N 35/00* (2006.01)

(52) U.S. Cl.
  CPC ......... *G01N 21/95* (2013.01); *G01N 35/0099* (2013.01); *G01N 2201/06113* (2013.01)

(58) Field of Classification Search
  USPC .......................................................... 209/518
  See application file for complete search history.

(56) References Cited

U.S. PATENT DOCUMENTS

| | | |
|---|---|---|
| 5,295,586 A | 3/1994 | Sheldon et al. |
| 6,115,926 A | 9/2000 | Robell |
| 2010/0188500 A1 | 7/2010 | Bouchard et al. |
| 2017/0008303 A1* | 1/2017 | Loebel ...................... B41J 2/01 347/110 |

* cited by examiner

FINISHING LINE AUTOMATIC INSPECTION SYSTEM AND METHOD

CROSS REFERENCE TO RELATED APPLICATIONS

This application is a continuation of U.S. patent application Ser. No. 17/645,519, filed Dec. 22, 2021, and claims the benefit of priority to U.S. Provisional Patent Application No. 63/130,498, filed on Dec. 24, 2020, the entirety of which are incorporated herein by reference.

BACKGROUND

Surface coverings, such as for floor coverings, ceilings, furniture, doors, millwork, and the like, may include, but are not limited to, hardwood, engineered hardwood, laminates, composites, and combinations thereof. Laminate flooring is a multi-layer synthetic flooring product that typically has a top layer with a pre-designed texture, pattern, or textured images printed thereon to resemble real wood. Engineered hardwood flooring contains a top veneer layer of solid wood over a core layer of man-made materials such as plywood or high-density fiberboard (HDF). A bottom veneer layer may also be provided. Most surface coverings are manufactured by automated manufacturing processes.

The finished product must be carefully inspected to ensure defective pieces are prevented from being delivered to customers. With regard to laminate or engineered hardwood flooring planks, the inspection process, as now practiced, typically consists of manual inspection for two types of defects: mechanical and look.

Mechanical defects may include a wide variety of defects including veneer splits and cracks over a certain size or length, veneer voids greater than a given size, defective tongues and grooves, corner chips, splinters, excessive positive or negative bowing, and improper or incomplete putty repairs for veneer voids. These mechanical defects may have objective criteria against which detected characteristics are capable of being judged.

The look defects may include issues associated with the stain color and/or stain lines on each plank, excessively large putty repairs in a veneer, and other unrepairable veneer look defects. Assessing look defects is typically a more subjective analysis.

Thus, in prior art manufacturing environments, there is a wide variety of defects to be manually scanned for in each plank. Manual scanning includes not only a requirement to visually identify one or more defects, but also to make a decision to accept or reject each plank as it progresses along a production line and then, if a decision to reject has been reached, to act upon that decision by physically removing the plank to a reject position or location.

Because of the large number of types of defects, and the degree of variation for each, a significant amount of time and effort is required to train, retrain, and update inspection personnel as to proper or required inspection criteria. Given that the inspections must occur and be consistent over multiple shifts and across multiple product lines, this places a large responsibility on training resources and on the personnel performing the inspections. A concomitant investment in training resources is thus required.

In one exemplary manufacturing environment for engineered hardwood, at an approximate production line speed of 100 planks per minute per inspection line, an inspector is given approximately 0.6 seconds to scan a 3.25 in. wide plank as it passes the inspector's station. In that time, the inspector has to identify whether the plank has or does not have a mechanical or look defect according to a variety of predefined criteria, to make a decision to reject or accept the plank based upon that identification, then to physically move the plank for rejection if identified as being defective. This manual scan-and-decide operation must occur approximately 100 times per minute for a wide variety of mechanical and look defects of various types. While planks moving along the inspection line at a given time interval are of the same veneer type, the same inspector is typically required to be knowledgeable as to inspection criteria for a range of veneer surfaces, such as smooth, soft scrape, hard scrape, wire brush, and distressed, as well as for a variety of stain colors and application patterns, for planks of different widths. With this manual scanning system, defects are sometimes missed and found later by the consumer upon installation, which is undesirable.

Thus, a need exists for an automated system and method that is capable of detecting at least one class of manufacturing defects in piece parts traveling along a production path, thereby enabling inspection personnel to focus on more subjective aspects of piece part appearance. The present disclosure provides such an automated system and method.

BRIEF SUMMARY

The presently disclosed system and method provides the ability to automatically detect mechanical defects in piece parts, such as floor covering planks, and to remove the defective parts off an inspection path through the use of a bypass conveyor system. Such mechanical defects include, without limitation, defects such as veneer voids over a given size or size range, veneer splits and cracks over a given length and/or width, failed putty repairs, defective tongues and grooves, corner chips, and excessively bowed planks. The bypass conveyor system enables the mechanically defective parts to be transported beyond or around a manual inspection such that only those parts determined by the present system and method to not have mechanical defects are subject to consideration by an inspector for more subjective look defects, largely relating to the overall appearance of the parts. With the removal of all or most of the mechanical defect types, the personnel performing the subsequent inspection will be able to focus on the look defects. Reducing the manual inspection to a single defect class provides an increase in inspection accuracy by simplifying the range of defects to be detected and by providing a larger amount of time per defect type, on average. The human eye is very good at identifying look defect types, especially when one plank surface appearance differs from the previous plank surface. This limits the range of plank appearance variables to be taught to inspectors, thereby reducing the time required to provide initial and on-going training.

Once the remaining parts have been inspected by a manual process, the parts transported by the bypass conveyor system are returned to the production line. To enable the mechanically defective parts to be distinguished from parts that have passed the subjective look review, a marking capability is provided in conjunction with the mechanism for transferring defective parts to the bypass conveyor. The marking capability may provide the ability to mark the defective parts according to a variety of classes of defects, such that remediation may optionally be practiced after all inspection steps have been carried out. Such marking may also facilitate the transfer of defective parts to an appropriate receptacle or storage facility.

In a first aspect, disclosed is a system for automatic inspection of piece parts in a production facility. The system comprises a driven production path for serially transporting individual units of the piece parts along a direction of travel and an alternate conveyance path proximate the production path. A first optical system for detecting characteristics of the individual units as each progresses on the production path is provided proximate the driven production path. A database of standards for each of a plurality of characteristics of the piece parts is provided. A processor, which is in communication with the first optical system and the database of standards, is provided for analyzing the detected characteristics of each of the individual units using the standards as to one or more of the plurality of characteristics from the database. A piece part diverter assembly, intermediate the production path and the alternate conveyance path, selectively diverts ones of the individual units from the production path onto the alternate conveyance path in response to input from the processor having determined that at least one of the standards associated with a respective characteristic has not been met.

In embodiments, the production path is a conveyor and the alternate conveyance path is a vacuum belt conveyor while, in another embodiment, the alternative conveyance path is a diversion conveyor. The system may further include a separator for separating multiple units of the piece parts into the individual units for serial transport by the driven production path.

Further, in an embodiment, the system includes an alignment module for orienting the individual units with respect to the production path. This alignment module may include at least one mechanical barrier for selectively preventing ones of the individual units from proceeding along the production path. The at least one barrier may be comprised of two vertically actuatable rods, each having a respective actuator in communication with the processor, the rods being disposed adjacent to the production path. Each rod is orthogonal to the direction of travel of the production path. For example, if the production path is horizontal, the rods are vertically actuable. Such rods are adapted to be selectively moved upwards to prevent one of the individual units from proceeding along a portion of the production path and to be selectively moved downwards to allow the one of the individual units to proceed along the portion of the production path. At least one optical detector, in communication with the processor, may be provided for detecting when one of the individual units is abutted against both of the rods and for moving the rods downwards to allow that individual unit to proceed along the production path. At least one optical detector may be provided in communication with the processor for detecting when the one of the individual units has proceeded along the production path beyond the rods prior to the processor causing the rod actuators to again move the rods upwards. The processor may allow a time interval to elapse between the alignment module allowing successive individual units to proceed along the production path.

In another embodiment, the system further includes an encoder in association with the production path and in communication with the processor for enabling the processor to determine the rate at which the production path is driven.

In another embodiment, the system includes an individual unit optical detector for detecting the relative or absolute location of each of the individual units on the production path, for detecting the rate of movement of the individual units on the production path, or both.

In yet another embodiment, the system further includes a movement dampening module for inhibiting movement of the individual units with respect to the production path. This module may include brushes or foam rollers disposed proximate the production path.

Further still, the first optical system of the system may comprise at least one three-dimensional laser scanner.

In one embodiment of the presently disclosed system, the individual units are hardwood, engineered hardwood, laminates, composites, and combinations thereof and the detected characteristics comprise one or more of: the presence and size of one or more veneer void areas; the presence and size of one or more veneer splits; the presence and size of one or more veneer cracks; the length of an individual unit; the degree of positive or negative bow of an individual unit; the minimum depth of the veneer; and the maximum depth of the veneer.

In another embodiment, the individual units are wood veneer planks and the database of standards defines, with respect to each individual unit, an acceptable limit or range of limits for one or more of: a veneer void area; a crack width and/or length; a plank of proper length; a degree of positive or negative bow; and a veneer depth.

In yet another embodiment, the system includes a second optical system for detecting characteristics of the individual units proximate the ends thereof as each progresses on the production path. These characteristics may include: the depth and/or length of a respective tongue or groove; the geometry of the corners of the ends; the quality of the staining of the corners of the ends; the quality of the veneer at the ends; and the quality of the veneer bevel at the ends.

The piece part diverter assembly of the system includes, in one embodiment, a transfer system intermediate the production path and the alternate conveyance path for selectively transferring ones of the individual units from the production path to the alternate conveyance path in response to input from the processor. The alternate conveyance path may be above a portion of the production path, the transfer system including an elevator system for selectively elevating the ones of the individual units from the production path to the alternate conveyance path. The elevator system may include a pneumatic pusher for selectively elevating the ones of the individual units.

In another embodiment, the piece part diverter assembly includes at least one robotic manipulator for selectively removing the ones of the individual units from the production path onto the alternate conveyance path. Further, the alternate conveyance path may include at least one diversion conveyor for returning diverted ones of the individual units back to the production path.

In an embodiment, the piece part diverter assembly includes a marking system for selectively marking the ones of the individual units prior to each being transferred to the alternate conveyance path. The marking system may be for selectively marking the ones of the individual units using a single chalk or at least one of plural chalks, each chalk of the plural chalks having a unique respective color. In a further embodiment, the plural chalks are UV-reactive. The marking system may be in communication with the processor and may be configured to selectively mark the ones of the individual units in response to the processor analyzing the detected characteristics of each of the individual units using the standards for one or more of the plurality of characteristics.

In another embodiment, the system further includes a manual inspection station after the piece part diverter assembly. At least one diversion conveyor may be provided intermediate the alternate conveyance path and the production path for returning the selectively diverted ones of the individual units back to the production path after the manual inspection station. A defecting unit for detecting and offloading the selectively diverted ones of the individual units from the production path to a waste receptacle may also be provided.

A third optical system, in communication with the processor and disposed at least partially under production path, may also be provided in another embodiment for detecting characteristics of a veneer disposed on an underneath surface of each of the individual units.

In another aspect of the present disclosure, a system for automatic inspection of piece parts in a production facility is provided. The system may include a driven production conveyor for serially transporting individual units of the piece parts and an alignment module having two vertically actuatable rods, each having a respective actuator in communication with the processor, disposed adjacent to the production conveyor and mutually orthogonal to the direction of travel of the production conveyor. The rods may be adapted to be selectively moved upwards to prevent one of the individual units from proceeding along the production conveyor and to be selectively moved downwards to allow the one of the individual units to proceed along the production conveyor. A movement dampening module for inhibiting movement of the individual units with respect to the production conveyor is provided, as is a diversion conveyor proximate and above a portion of the production conveyor. A first three-dimensional laser scanner system for detecting characteristics of the individual units as each progresses on the production conveyor is provided, as is a second three-dimensional laser scanner system for detecting characteristics of the individual units proximate the ends thereof as each progresses on the production conveyor. The system further includes a database of standards for each of a plurality of characteristics of the piece parts, as well as a processor in communication with the first optical system and the database of standards for analyzing the detected characteristics of each of the individual units using the standards for one or more of the plurality of characteristics from the database. At least one robotic manipulator intermediate the production conveyor and the diversion conveyor is provided for selectively diverting ones of the individual units from the production conveyor onto the diversion conveyor in response to input from the processor having determined that at least one of the standards associated with a respective characteristic has not been met. Further, a marking system is configured for selectively marking the diverted ones of the individual units using one of plural chalks, each chalk having a unique respective color, the diverted ones of the individual units being marked in response to the processor analyzing the detected characteristics of each of the individual units using the standards for one or more of the plurality of characteristics.

In an embodiment, the alignment module further comprises at least one optical detector, in communication with the processor, for detecting when one of the individual units is abutted against both of the rods and for moving the rods downwards to allow the one of the individual units to proceed along the production path. The alignment module may have at least one optical detector for detecting when the one of the individual units has proceeded along the production path beyond the rods prior to the processor causing the rod actuators to move the rods upwards. The processor may further allow a time interval to elapse after one of the individual units has proceeded along the production path beyond the rods prior to the processor causing the rod actuators to move the rods downwards to ensure proper separation of individual units.

In another embodiment, the system may further include an encoder in association with the production conveyor and in communication with the processor for enabling the processor to determine the rate at which the production conveyor is driven.

In an embodiment, the system may include an individual unit optical detector. The individual unit optical detector may be for detecting the relative location of each of the individual units on the production path, for detecting the rate of movement of each of the individual units on the production path, or both.

Further still, the system may include a manual inspection station after the at least one robotic manipulator and the marking system. In this embodiment, at least one diversion conveyor is for returning the selectively diverted ones of the individual units back to the production conveyor after the manual inspection station. A defecting unit for detecting and offloading the selectively diverted ones of the individual units from the production conveyor to a waste receptacle may also be provided.

In yet another embodiment, a third optical system, in communication with the processor and disposed at least partially under the production conveyor, is for detecting characteristics of a veneer disposed on an underneath surface of each of the individual units.

In another aspect, provided is a method for automatically inspecting piece parts in a production facility. Individual units of the piece parts are conveyed on a production conveyor. Characteristics of the individual units are detected, using a first optical system, as each progresses on the production conveyor. The detected characteristics are received by a processor in communication with the first optical system, and the received characteristics are compared to standards for each of a plurality of characteristics of the piece parts stored in a database in communication with the processor. Ones of the individual units are selectively diverted from the production conveyor to a diversion conveyor in response to the comparison of the received characteristics to the standards by the processor. The selectively diverted ones of the individual units are then selectively marked according to the comparison.

In an embodiment, the method further includes aligning the individual units to be orthogonal to the direction of travel of the production conveyor prior to the first optical system.

In another embodiment, the method further includes dampening movement of the individual units with respect to the production conveyor using a movement dampening module prior to the first optical system.

In yet another embodiment, the first optical system of the method is a three-dimensional laser scanner.

Further still, the method may include detecting characteristics of the individual units proximate the ends thereof, using a second optical system, as each progresses on the production conveyor.

In still another embodiment of the method, the selective diverting is performed by at least one robotic manipulator for selectively elevating the ones of the individual units to the diversion conveyor.

In another embodiment, the step of selectively marking includes selectively marking using at least one of plural chalks, each chalk having a unique respective color. In a further embodiment, the chalks are UV-reactive. The selective marking system may be in communication with the processor and the method may further include selectively marking the ones of the individual units in response to the processor analyzing the detected characteristics of each of the individual units using the standard for one or more of the plurality of characteristics.

In yet another embodiment, the method may further include manually inspecting the individual ones after the step of selectively diverting. Further, the method may include returning the ones of the individual units to the production conveyor after the step of manually inspecting.

DETAILED DESCRIPTION OF EXEMPLARY EMBODIMENTS

Figure 1:
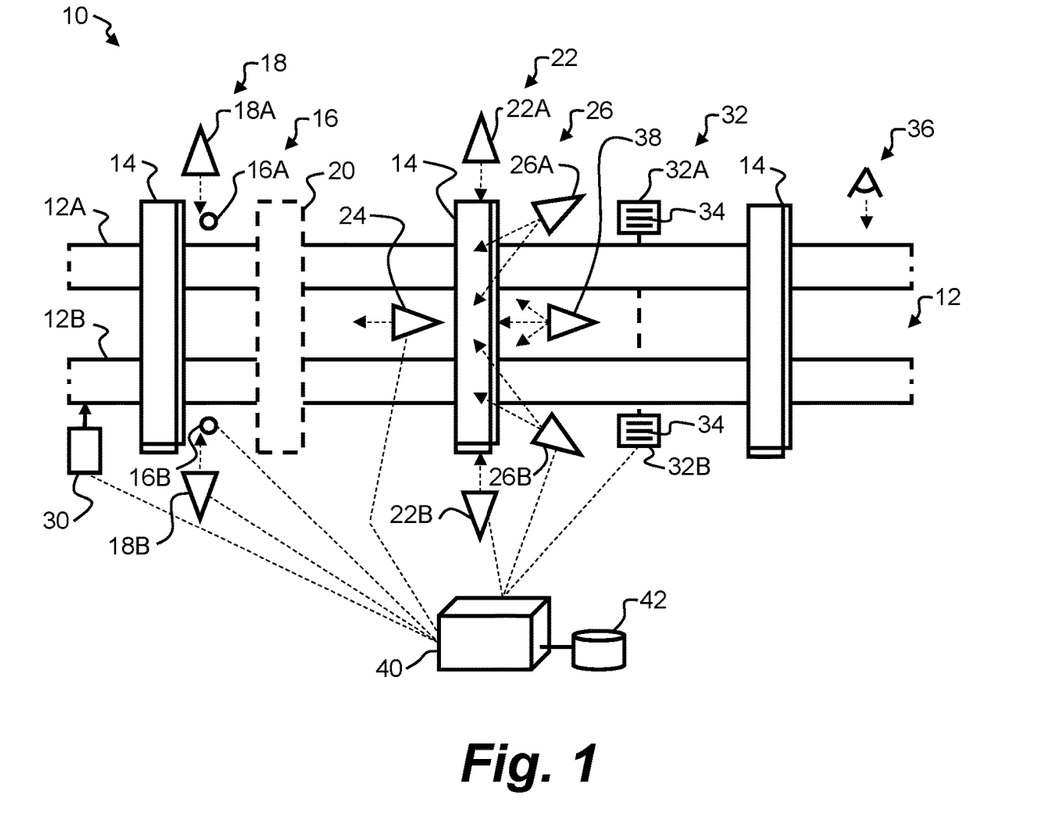
FIG. 1 is a plan schematic view of a system for finishing line automatic inspection.
Figure 2:
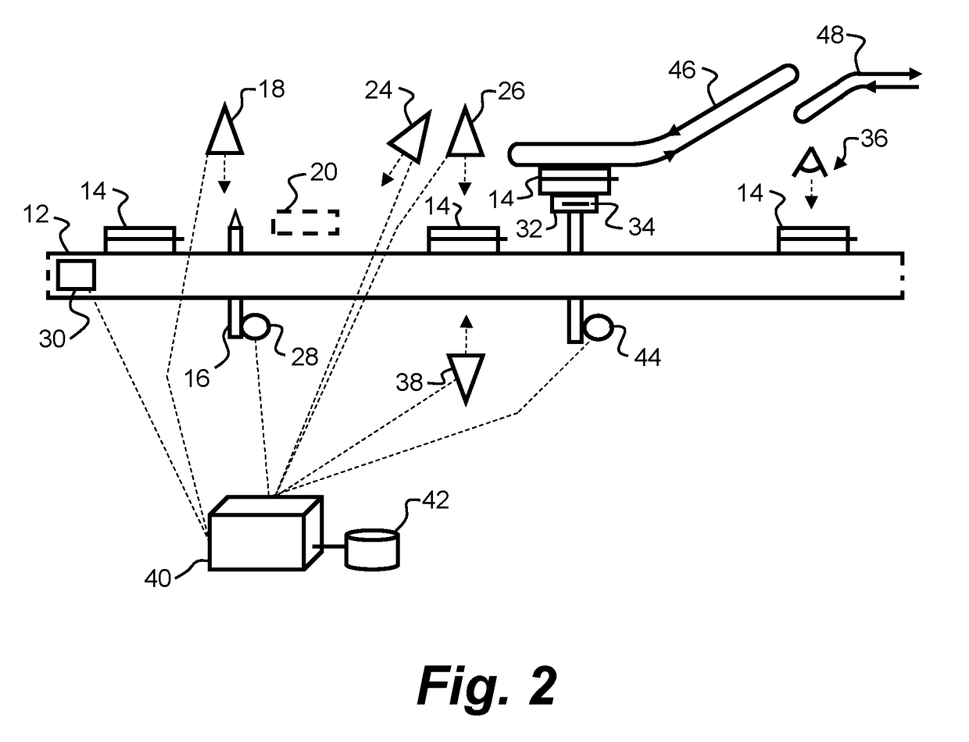
FIG. 2 is an elevation schematic view of the system of FIG. 1.
Figure 3A:
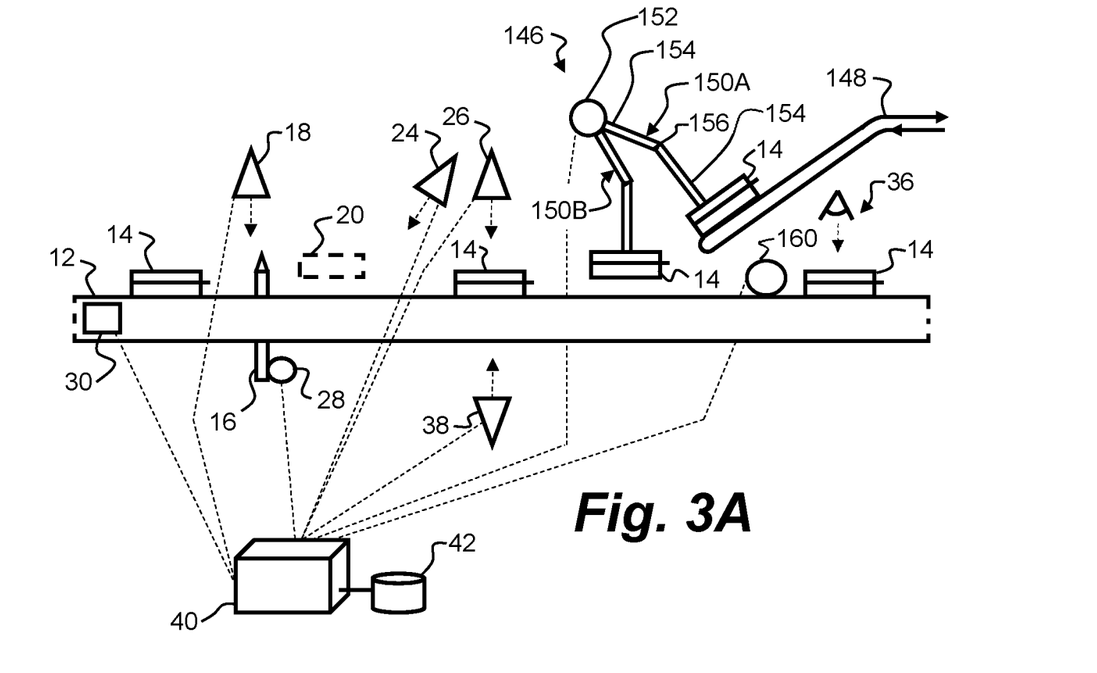
FIG. 3A is an elevation schematic view of an alternative embodiment of the system of FIGS. 1 and 2.
Figure 3B:
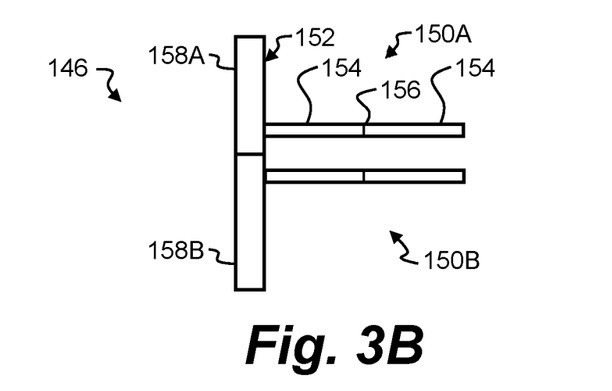
FIG. 3B is a plan schematic view of a robotic manipulator of FIG. 3A.

FIG. 1 provides a plan view of a system for finishing line automatic inspection 10 and FIG. 2 provides an elevation view of the same system. FIGS. 3A and 3B provide an alternative to the system of FIGS. 1 and 2. The finishing line may be applicable to a wide variety of manufacturing environments producing many different products subject to final inspection as to construction and appearance. For purposes of illustration, though, the disclosed production line is for producing floor covering planks, such as engineered hardwood planks.

Individual units of piece parts as shown in the figures are planks 14 of flooring material being carried by a driven production path 12 such as a driven conveyor belt. As illustrated, the conveyor belt may in fact be implemented by two discrete belts 12A, 12B running in parallel and at the same speed. As shown in FIG. 1, the conveyor belt translates planks from left to right.

While discrete planks 14 are shown in the figures, the present disclosure may further include a separator (not shown) for separating accumulations of multiple piece parts into individual units which are, as shown, flooring planks.

The piece parts may be planks with exemplary widths of 3.25 inches, 5.0 inches, and/or 6.375 inches. The production path translational speed may vary depending upon the piece part width. For example, 3.25 inch wide planks may be run at approximately 100 planks per minute, 5.0 inch wide planks may be run at approximately 50 planks per minute, and 6.375 inch wide planks may be run at approximately 40 planks per minute. The plank surfaces may be smooth, hand scraped, soft scraped, distressed, or wire brushed. The plank veneer top surface may have a beveled edge, such as a pillow bevel or micro bevel.

To facilitate automated inspection, it is beneficial for the individual units to be uniformly spaced and oriented along the driven production path 12. An alignment module 16 is provided for this purpose. In one embodiment, the alignment module comprises mechanical barriers provided as first and second substantially vertical and vertically actuatable separator rods 16A, 16B. Each rod is provided with a respective actuator 28 (FIG. 2) for selective elevation and retraction along a respective substantially vertical axis of symmetry. As discussed below, the actuators 28 for each vertical separator rod 16A, 16B are in communication with and under the operational control of a processor 40. While not illustrated, the upper end of each separator rod may terminate in a point or other narrow feature to facilitate inserting the vertical rod before a next plank.

An optical detector 18 of the alignment module 16, provided proximate the production path 12, has a field of view that includes the separator rods 16A, 16B. As shown in FIGS. 1 and 2, the illustrated embodiment of the optical detector includes two cameras 18A, 18B, each having a respective one of the vertical separator rods 16A, 16B within a respective field of view. One or more than two cameras are also employable in alternative embodiments.

In a default state, each of the vertical separator rods 16A, 16B may be elevated with respect to the production path 12. As a next individual unit 14 proceeds on the production path conveyor belt 12, it may come into contact with at least one of the elevated vertical separator rods 16A, 16B. Because the individual unit may not be orthogonal to the direction of travel, one end of the individual unit may come into contact with one of the vertical separator rods before the other end comes into contact with the other vertical separator rod. Once each end of the individual unit is in contact with a respective one of the vertical rods, as detected by the processor 40 based upon the optical detector 18 image input, the separator rods are moved downward by the respective actuators 28 under control of the processor, and the individual unit is allowed to proceed along the production path.

Once the processor 40 has detected that the individual unit 14 has proceeded beyond the vertical separator rods 16A, 16B based upon the image input from the optical detector 18, the processor again commands the actuators 28 to raise the vertical separator rods into position for receiving the next individual unit traveling along the production path 12.

In an alternative embodiment, the processor 40 does not immediately move the vertical separator rods 16A, 16B downward once each end of the individual units 14 is in contact with a respective one of the separator rods. Rather, the processor may track the time interval between which individual units are allowed to proceed on the production path as a result of retracting the vertical separator rods. This ensures a minimum degree of separation, measured in time or distance, between individual units is provided to facilitate later processing by the system for automatic inspection 10. In order to determine the amount of time or distance required between individual units, the processor is in communication with a production path encoder 30. This encoder may be a mechanical, optical or other type of encoder for detecting the translational speed of the production path and for providing an output signal reflective of that speed to the processor.

Once released by the alignment module 16, the individual unit 14 is immediately accelerated by the production path 12 upon which it rests. This acceleration may cause unwanted vibrations or other movement in the individual unit on the production path. Having just been orthogonally aligned with respect to the direction of production path travel by the alignment module 16, unwanted movement may cause the individual unit to become misaligned on the production path. In an optional embodiment of the presently disclosed finishing system, a movement dampening system 20 is provided proximate the production path 12 after the alignment module 16. The movement dampening module may comprise a foam roller(s), brushes or other devices for removing vibrations and for causing the individual unit to settle with respect to the production path 12.

A first optical system 26 for detecting mechanical characteristics of the individual units 14 as they progress along with production path 12 is also provided. In an illustrative embodiment, the first optical system includes at least one three-dimensional (3-D) laser scanner, and in a particular, illustrated embodiment two 3-D laser scanners or profiler 26A, 26B are included. These laser scanners are disposed proximate the production path 12 in order to have an unobstructed view of the entirety of at least the upper surface of the individual units 14 as they progress along the production path 12. In one embodiment, the laser scanners are fixed with respect to the production path and are provided with optical elements that enable the characterization of the entirety of the individual unit upper surface. In an alternative embodiment, mechanical scanning capabilities are provided. Appropriate lighting sources are also provided to facilitate image capture.

The first optical system 26 is in communication with the processor 40 for providing signals reflective of the detected mechanical characteristics of the individual unit surface or surfaces scanned by the 3-D laser scanners 26A, 26B.

The processor 40 is also in communication with a database 42 of standards for each of plural mechanical or other characteristics of the piece parts. The standards may be absolute values such as values of length or area, or may be graphical representations of certain areas or portions of individual units, such as acceptable bevel profiles or crack widths. The characteristics assessed by the processor on the basis of the first optical system 26 output may include: the presence and size of one or more veneer void areas; the presence and size of one or more veneer splits; the presence and size of one or more veneer cracks; the length of an individual unit; the degree of positive or negative bow of an individual unit; the minimum depth of the veneer; and the maximum depth of the veneer. The standards against which the assessed characteristics are measured may include: an acceptable limit or range of limits for: a veneer void area; a crack width and/or length; a plank of proper length; a degree of positive or negative bow; and a veneer depth. The processor may apply artificial intelligence (AI) algorithms having the standards as inputs for assessing the signals reflective of the detected mechanical characteristics of the individual unit surface or surfaces. One or more automated or manual feedback mechanisms may be provided for tuning/training the AI algorithms.

The processor 40 thus receives the output from the first optical system 26 and compares each of certain scanned characteristics against the standards stored in the database 42. The processor may then be programmed to cause certain subsequent actions to occur based upon the comparison of the scanned characteristics with the standards, as will be discussed subsequently.

The first optical system 26 may also characterize physical features of the individual units 14, such as piece part width and/or length. This information may determine which of plural standards are to be retrieved for one or more characteristics from the database 42.

One embodiment of the presently disclosed system 10 for automatic inspection may further include an individual unit 14 detector 24, or leading edge detector, for coordinating the operation of the first optical system 26 as the individual unit proceeds along with production path 12. This detector 24 may be disposed proximate the production path, such as above or below the path. The output of this detector is provided to the processor 40 for associating the output of the first optical system with a respective individual unit 14 and may be used to initiate a scanning process by the first optical system 26. The detector 24 may alternatively or also provide an indication of the rate of movement of production path and individual units thereon to the processor, thus making the encoder 30 unnecessary.

The automatic inspection system 10 may further comprise a second optical system 22 proximate the production path 12 for characterizing end portions of the individual units 14. As shown in FIG. 1, the second optical system may comprise 3-D laser scanners or profilers and may include a first optical detector 22A at a leftmost end of the individual unit as it travels along the production path 12 and a second optical detector 22B at a rightmost end of the individual unit as it travels along the production path. These first and second optical detectors may be 3-D laser scanners in communication with the processor 40 for conveying image data thereto. The processor may use this image data for assessing certain characteristics of the end regions of the individual units 14. These characteristics may include: the depth and/or length of a respective tongue or groove; the geometry of the corners of the individual unit ends; the quality of the staining of the corners of the ends; the quality of the veneer at the ends; and the quality of the bevel at the ends. Specifically, the second optical system output may be used by the processor to determine if the tongue area is equal to Y square mm and if the tongue length is equal to X % of the individual unit width. The standards database 42 may be referenced by the processor in assessing whether the detected characteristics of the of the individual unit end regions are within predefined acceptable limits.

As illustrated in FIGS. 1 and 2, the system for automatic inspection 10 may further include a third optical system 38 for characterizing aspects of an underneath surface of each of the individual units 14. For example, the output of this system may be assessed by the processor to determine if the underneath surface of an individual unit is sufficiently covered by veneer. Accordingly, the third optical system, which may comprise at least one 3-D scanner, is at least partially disposed beneath the production path 12. In that the illustrated production path 12 includes two discrete conveyor bands, the third optical system may only have optical access to a portion of the underneath surface of each individual unit. The standards database 42, selectively referenced by the processor 40, may be provided with corresponding acceptable characteristics for the underneath surfaces, such as those provided for characterizing the upper surfaces of the individual units.

The presently disclosed system for automatic inspection 10 is particularly useful in an environment having a subsequent manual inspection station 36 along the production path 12. While the automatic inspection system is useful for detecting aspects of the individual units 14 that are considered mechanical in nature and are subject to objective criteria as to acceptability, the manual inspection station may be for detecting aspects of the individual units that pertain to the subjective look or appearance of the individual units. However, in alternative embodiments, the automatic inspection system is configured to and is capable of performing assessments as to both mechanical and look criteria, and to take action is response to comparisons with respect to standards retained within the database 42.

Should the processor 40 determine that one or more characteristics, determined by the first, second, and/or third optical systems 26, 22, 38, is outside an acceptable range of values, as determined through comparison against the respective standards as stored in the database 42, the system for automatic inspection 10 is configured to remove the respective individual unit 14 from the production path 12. As a result, personnel located at a subsequent manual inspection station 36 are only presented with, and tasked with reviewing, individual units 14 already determined to be free of mechanical or other defects that would otherwise warrant rejection based upon insufficient quality. This allows the personnel at the manual inspection station to devote the limited amount of time during which each individual unit is being considered to a smaller subset of primarily subjective quality criteria.

As alluded to in the foregoing, the presently disclosed system for automatic inspection 10 includes, in addition to resources that facilitate the inspection of individual units 14 as they progress along the production path 12, facilities for removing individual units determined to have mechanical or other defects from the production path. Specifically, the system as illustrated in FIGS. 1 and 2 includes an alternate conveyance path 46 and a piece part diverter assembly 32 for selectively diverting ones of the individual units from the production path onto the alternative conveyance path in response to the processor 40 having determined, on the basis of input from at least one of the first, second, and third optical systems 26, 22, 38, that at least one of the standards stored in the database 42 associated with a respective characteristic of an individual unit has not been met. As previously alluded to, in one embodiment, such a characteristic or characteristics are mechanical in nature and the determination that a respective standard has not yet been met is an objective determination. However, in alternative embodiments, the characteristics upon which a rejection decision is made by the processor are both mechanical and look- or appearance-based in nature.

The piece part diverter assembly 32, in the illustrated embodiment shown in FIGS. 1 and 2, includes an elevator system having two vertically oriented pneumatic pushers 32A, 32B for contacting an underside of an individual unit 14 determined to be defective. In the embodiment in which the production path 12 is made up of two parallel belts 12A, 12B, the pushers are disposed outside the lateral extent of each belt. In alternative embodiments, the diverter system may include a single pneumatic pusher in between the parallel belts.

Each pneumatic pusher 32A, 32B has an actuator 44 in mechanical association therewith for selectively driving the respective pneumatic pusher up and down in response to commands from the processor 40. Thus, when the processor has determined a detected characteristic of an individual unit 14 does not meet a respective standard from the database 42, the processor may cause the pneumatic pushers 32A, 32B to elevate that individual unit off the production path and to the alternate conveyance path 46. In one embodiment, the vertical travel distance for individual units determined to have one or more defects is roughly one inch.

In an alternative embodiment, the piece part diverter assembly 32 may be a laterally oriented pneumatic pusher oriented for selectively pushing a defective individual unit 14 off the production path 12 to one side thereof. The alternate conveyance path 46 may be in this embodiment another conveyor that is at the same height or slightly lower than the production path and configured to receive defective individual units offloaded from the production path by this embodiment of the pneumatic pusher.

Returning to the illustrated embodiment, the piece part diverter 32 is provided with a marking system 34. As shown in FIG. 1, each pneumatic pusher 32A, 32B may have such a marking system in association therewith. This marking system may include plural chalks, each retained by a respective actuator, which in one embodiment is a pneumatic actuator, though other drive means are employable. In one embodiment, the chalks are UV-reactive chalks and are not observable under daylight conditions. The marking system is also in communication with the processor 40. Each type of defect that is identifiable by the processor on the basis of standards stored in the database 42 may be associated with a respective chalk color. Thus, when a given defect is identified in an individual unit, the processor actuates one of the chalk actuators of the marking system for applying a mark with the respective chalk. The type or class of defect associated with that individual unit is thus identifiable and may be useful in deciding whether later remediation of certain faults is possible and, if so, what kind of remediation is required. Other marking materials may be used in alternative embodiments.

As shown in FIG. 1, there is one marking system 34 associated with each of the two illustrated pneumatic pushers 32A, 32B. The same mark can thus be applied to each end of the individual unit 14, or each end may be independently marked according to the detected characteristics of the individual unit. In addition, multiple chalk marks of different colors may be applied, depending upon the detected characteristics of the individual unit.

As shown in FIG. 2, the alternate conveyance path 46 is a conveyor having at least one end thereof over a portion of the production path 12. Thus, when the piece part diverter assembly 32 is actuated, an individual unit 14 determined to have one or more defects is raised into contact with the alternate conveyance path. For example, the lowest end of the alternate conveyance path is between 20 and 25 mm above the production path and is 12 inches in length, in the direction of production path travel. The alternate conveyance path in one embodiment is 32 inches wide.

In the illustrated embodiment, the alternate conveyance path 46 is a continuous vacuum belt conveyor loop having sufficient vacuum force to receive and retain an individual unit 14. In an embodiment, the vacuum belt conveyor is capable of supporting the plank weights. To remove the defective individual unit from the area proximate the production path 12, the alternate conveyance path may be provided with an upward incline. As shown in FIG. 2, this incline is approximately 30 degrees, and the arc through which individual units travel is a 30 inch radius bend from horizontal to the incline, though other angles and arcs are employable in other embodiments. Further still, in certain embodiments, the alternate conveyance path transports each individual unit at the same height at which it has been delivered by the piece part diverter assembly 32.

Also shown in FIG. 2 is a diversion conveyor 48. This diversion conveyor may be proximate the alternate conveyance path 44 and intermediate the alternate conveyance path and the production path 12. In one embodiment, rejected individual units 14 are carried up the inclined path of the alternate conveyance path 46 then travel intermediate the alternate conveyance path and the diversion conveyor, in contact with both, the two belts having substantially equal speeds of travel. At the end of the alternate conveyance path, the individual unit is released onto the diversion conveyor. With such an arrangement, an individual unit 14 determined to have a mechanical or other defect may be removed from the production path 12 prior to the manual inspection station 36, marked with the appropriate chalk or chalks to identify the detected defect(s) or class of defect(s), then returned to the production path after the manual inspection station. The diversion conveyor may be configured to return defective individual units to a particular lateral or other position on the production path reserved for defective materials. Alternatively, a subsequent defecting unit (not shown) may be provided for detecting the one or more chalk markings applied to the individual units by the marking system(s) 34.

In another embodiment, the alternate conveyance path 46 may be configured and oriented to return marked, defective individual units to the production path without the use of a diversion conveyor 48. Further still, the diversion conveyor, if employed, or the alternate conveyance path may divert defective, marked individual units to an alternate destination where the units may be assessed based upon the chalk marks for possible remediation or diversion to waste or recycling.

In an alternative embodiment shown in FIG. 3A, an alternate conveyance path is embodied by a robotic manipulator 146 having a hub 152 and at least one articulable arm 150A, 150B, each arm being independently rotatable about the axis of the hub by the respective hub segment 158A, 158B (FIG. 3B). All other elements of the system 10 are as described in the foregoing.

Each articulable arm 150A, 150B includes multiple arm segments 154. Each pair of segments has a respective joint 156 intermediate the pair. In the embodiment of FIG. 3A, each articulable arm is comprised of two segments and one intermediate joint. (It is understood that, in the illustrated embodiment, the articulable arm 150B has the same elements as articulable arm 150A though these are not labeled in the interests of visual clarity.)

The robotic manipulator 146 is in communication with and under the control of the processor 40. Should the processor 40 determine that one or more characteristics of an individual unit 14, determined by the first, second, and/or third optical systems 26, 22, 38, is outside an acceptable range of values, as determined through comparison against the respective standards as stored in the database 42, the system for automatic inspection 10 is configured to remove the respective individual unit 14 from the production path 12.

In the alternative embodiment of FIG. 3A, this is achieved by the processor causing one of the hub segments 158A, 158B to rotate the respective articulable arm 150A, 150B towards the individual unit 14 determined to be defective. The angle between the arm segments 154 through the respective joint 156 may be adjusted such that a lower end of the respective articulable arm extends downward to the individual unit at issue. An end of the articulable arm is provided with a grasping or attaching element that enables the arm to lift the individual unit off the production path 12. The respective hub segment 158A, 158B then rotates the articulable arm upwards, towards a diversion conveyor 148 having a lower end proximate the production path. The individual unit is then deposited on the diversion conveyor 148 for transport away from the production path. As with the embodiment of FIG. 2, the diversion path may return the defective individual unit to the production path after a manual inspection station 36, or may convey the defective individual unit directly to a waste collection facility.

It is understood that robotic manipulator 146 may engage a defective individual unit 14 and may deposit the individual unit on the diversion conveyor 148 through rotation of the arm segments 154 about the respective joint 156, through the selective extension and retraction of at least one arm, or both. The hub segments 158A, 58B and respective articulable arms 150A, 150B may be operated independently.

In yet a further embodiment, the system for automatic inspection 10 further includes a rejection manipulator 160, as shown in FIG. 3A. Should the processor 40 determine that the alternate conveyance path, embodied in either the vacuum belt conveyor 46 of FIG. 2 or the robotic manipulator 146 of FIG. 3A, is not capable of removing one or more defective individual units 14 from the production path 12, the rejection manipulator may be actuated by the processor to remove the defective individual units prior to the manual inspection station 36. For example, the rejection manipulator may be a laterally extending pushrod the pushes defective individual units off the side of the production path to a suitable receptacle.

The diversion conveyor 48 of FIG. 2 and diversion conveyor 148 of FIG. 3A may each require a mechanism for delaying the reentry of defective individual units 14 onto the production path 14. In the illustrative embodiment of FIG. 4, a sequence of individually actuable retainers 70 are provided along the path of the diversion conveyor 48 or 148. In the figure, defective individual units are progressing left to right. Space must exist on the production path 12 or other destination before the next defective individual unit 14 is to be allowed to progress off the end of the diversion conveyor. Each retainer is under the control of the processor 40 (not shown in FIG. 4). To stop the progress of an individual unit, the conveyor causes the rightmost retainer to rotate about a respective hub 72 such that a projection 74 extends up into the path of the individual unit, holding it in place. A subsequent individual unit may be allowed to progress on the diversion conveyor as long another individual unit is not stopped along the path ahead. If a stopped individual unit is ahead, the next upstream retainer is raised. Once a space exists beyond the diversion conveyor for the next defective individual unit, the retainer is rotated down and out of the way. With the path ahead open, the next upstream retainer is lowered to allow the respective individual unit to proceed. This process of selectively raising and lowering retainers allows controlled release of defective individual units without allowing them to bunch up and come into contact with each other.

Figure 4:
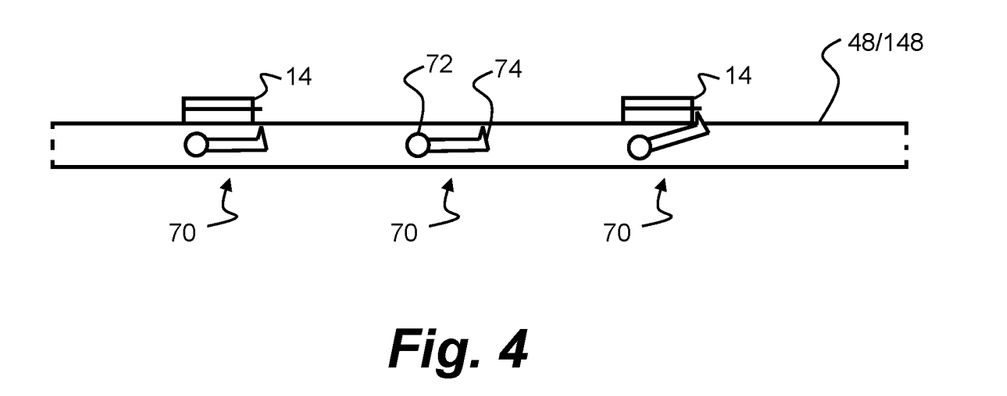
FIG. 4 is an elevation schematic view of a series of retainers along a diversion conveyor of FIG. 2 or 3A.

For example, if the rightmost individual unit 14 remains stationary, as shown in FIG. 4, as the next individual unit comes close to the middle retainer 70, the middle retainer will be raised. Once the rightmost retainer is lowered, allowing that individual unit to proceed, the middle retainer is lowered and the second individual unit is allowed to proceed. If there is space ahead for the second individual unit, the rightmost retainer stays down. If no space exists, the rightmost retainer is raised to stop the second individual unit.

Figure 5:
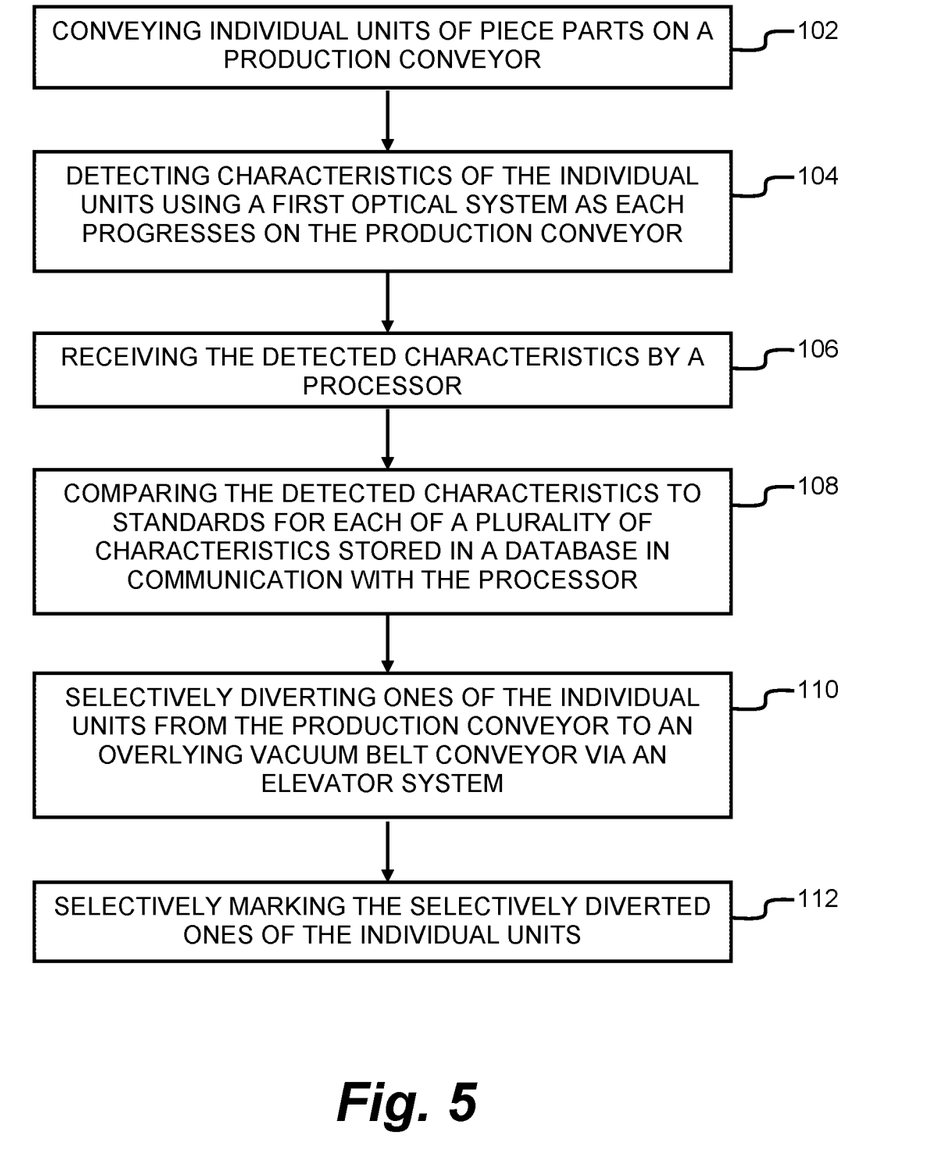
FIG. 5 is a flowchart of a method of use for the inspection system of FIGS. 1-4.

With regard to FIG. 5, a simplified method for performing automatically inspecting piece parts in a production facility is presented. This method is to be read in light of the foregoing description of the system of FIGS. 1, 2, 3A, 3B, and 4.

At step 102, individual units are conveyed by a production conveyor. At step 104, characteristics of the individual units are detected using a first optical detection system as each progresses on the production conveyor. As described above, this first optical system includes 3-D laser scanners for characterizing at least a portion of the upper surface of each individual unit, in an illustrated embodiment.

At step 106, a processor in communication with the first optical system receives the detected characteristics from the first optical system. These detected characteristics are then compared by the processor against standard values, representations, or images as stored in an associated standards database, as indicated at step 108. In response to this comparison or comparisons, individual units are selectively diverted from the production path to an alternate conveyance path which, in the illustrated embodiment, is an overlying vacuum belt conveyor, as per step 110. Individual units subject to selective diversion are selectively marked according to the results of the comparison(s) performed by the processor with respect to the standards stored in the associated database to facilitate later remedial processing or routing, as per step 112. Individual units that are not selectively diverted remain on the production path and are subject to manual inspection.

Alternative embodiments of the subject matter of this application will become apparent to one of ordinary skill in the art to which the present invention pertains, without departing from its spirit and scope. It is to be understood that no limitation with respect to specific embodiments shown here is intended or inferred.

What is claimed is:

1. A system for automatic inspection of piece parts in a production facility, the system comprising:
    a production path for serially transporting individual units of the piece parts along a direction of travel;
    an alternate conveyance path proximate the production path;
    a first image capture system for detecting characteristics of the individual units as each progresses on the production path;
    a database of standards for each of a plurality of characteristics of the piece parts;
    a processor in communication with the first image capture system and the database of standards for analyzing the detected characteristics of each of the individual units using the standards for one or more of the plurality of characteristics from the database; and
    a piece part diverter assembly intermediate the production path and the alternate conveyance path for selectively diverting ones of the individual units from the production path onto the alternate conveyance path in response to input from the processor having determined that at least one of the standards associated with a respective characteristic has not been met,
        wherein the alternate conveyance path is in at least one of a different plane than the production path,
        wherein the piece part diverter assembly comprises an elevator system comprising a pusher for selectively contacting an individual unit and diverting the ones of the individual units from the production path to the alternate conveyance path,
        wherein the pusher comprises a marking system, and
        wherein the alternate conveyance path comprises at least one diversion conveyor for returning the selectively diverted ones of the individual units back to the production path.

2. The system of claim 1, wherein the production path is a conveyor.

3. The system of claim 1, wherein the alternate conveyance path is a vacuum belt conveyor.

4. The system of claim 1, further comprising an alignment module for orienting the individual units with respect to the production path.

5. The system of claim 4, wherein the alignment module further comprises at least one mechanical barrier for selectively preventing ones of the individual units from proceeding along the production path.

6. The system of claim 5, wherein the at least one mechanical barrier comprises two vertically actuatable rods, each having a respective actuator in communication with the processor, disposed adjacent to the production path and different to the direction of travel of the production path, the rods adapted to be selectively moved in a different direction to prevent one of the individual units from proceeding along a portion of the production path and to be selectively moved to allow the one of the individual units to proceed along the portion of the production path.

7. The system of claim 6, wherein the alignment module further comprises at least one sensor, in communication with the processor, for detecting when one of the individual units is abutted against both of the vertically actuatable rods and for moving the vertically actuatable rods to allow the one of the individual units to proceed along the production path.

8. The system of claim 7, wherein at least one sensor of the alignment module is capable of detecting when the one of the individual units has proceeded along the production path beyond the vertically actuatable rods prior to the processor causing the vertically actuatable rod actuators to move the vertically actuatable rods in the different direction.

9. The system of claim 6, wherein the processor is further configured for allowing a time interval after the one of the individual units has proceeded along the production path beyond the rods prior to the processor causing the rod actuators to move the rods to ensure proper separation of individual units.

10. The system of claim 1, further comprising an encoder in association with the production path and in communication with the processor for enabling the processor to determine the rate at which the production path is driven.

11. The system of claim 1, further comprising an individual unit optical detector for detecting the relative or absolute location of each of the individual units on the production path.

12. The system of claim 1, wherein the individual units comprise hardwood, engineered hardwood, laminates, composites, and combinations thereof and wherein the detected characteristics of the individual units comprise one or more of:
    a presence and size of one or more veneer void areas;
    a presence and size of one or more veneer splits;
    a presence and size of one or more veneer cracks;
    a length of an individual unit;
    a degree of positive or negative bow of an individual unit;
    a minimum depth of the veneer; and
    a maximum depth of the veneer.

13. The system of claim 1, wherein the individual units are wood veneer planks and wherein the database of standards defines, with respect to each individual unit, an acceptable limit or range of limits for one or more of:
    a veneer void area;
    a crack width and/or length;
    a plank of proper length;
    a degree of positive or negative bow; and
    a veneer depth.

14. The system of claim 1, further comprising a second image capture system for detecting characteristics of the individual units proximate the ends thereof as each progresses on the production path.

15. The system of claim 14, wherein the individual units proximate the ends thereof comprise:
    the depth and/or length of a respective tongue or groove;
    the geometry of the corners of the ends;
    a quality of the staining of the corners of the ends;
    a quality of the veneer at the ends; and
    a quality of the bevel at the ends.

16. The system of claim 1, wherein the piece part diverter assembly further comprises at least one manipulator for selectively removing the ones of the individual units from the production path and depositing the ones of the individual units onto the alternate conveyance path.

17. A system for automatic inspection of piece parts in a production facility, the system comprising:
- a driven production conveyor for serially transporting individual units of the piece parts;
- an alignment module comprising two actuatable rods, each having a respective actuator in communication with a processor, disposed adjacent to the production conveyor and different to the direction of travel of the production conveyor, the rods adapted to be selectively moved to prevent one of the individual units from proceeding along the production conveyor and to be selectively moved to allow the one of the individual units to proceed along the production conveyor;
- a movement dampening module for inhibiting movement of the individual units with respect to the production conveyor;
- a diversion conveyor proximate to and in at least one of a different plane and height from a portion of the production conveyor;
- a first scanner system for detecting characteristics of the individual units as each progresses on the production conveyor;
- a second scanner system for detecting characteristics of the individual units proximate the ends thereof as each progresses on the production conveyor;
- a database of standards for each of a plurality of characteristics of the piece parts;
- the processor in communication with the first scanner system and the database of standards for analyzing the detected characteristics of each of the individual units using the standards for one or more of the plurality of characteristics from the database;
- at least one manipulator intermediate the production conveyor and the diversion conveyor for selectively diverting ones of the individual units from the production conveyor onto the diversion conveyor in response to input from the processor having determined that at least one of the standards associated with a respective characteristic has not been met; and
- a marking system configured for selectively marking the diverted ones of the individual units using a UV reactive marking, the diverted ones of the individual units being marked in response to the processor analyzing the detected characteristics of each of the individual units using the standards for one or more of the plurality of characteristics,
  - wherein the marking system is part of a piece part diverter assembly that further comprises the at least one manipulator.

18. The system of claim 17, further comprising a manual inspection station after the piece part diverter assembly and at least one diversion conveyor intermediate the alternate conveyance path and the production path for returning the selectively diverted ones of the individual units back to the production path after the manual inspection station.

19. The system of claim 17, further comprising a rejection manipulator proximate the production path and in communication with the processor for selectively removing any of the ones of the individual units that were not removed from the production path by the piece part diverter assembly.

* * * * *